United States Patent [19]

Hardtmann

[11] 3,868,372

[45] Feb. 25, 1975

[54] ORGANOMERCAPTO-SUBSTITUTED POLYHYDRO IMIDAZO[1,5-A]PYRIDENES AND PYRIDE[1,2-C]PYRIMIDINES

[75] Inventor: Goetz E. Hardtmann, Florham Park, N.J.

[73] Assignee: Sandoz-Wander, Inc., Hanover, N.J.

[22] Filed: Aug. 13, 1973

[21] Appl. No.: 387,751

Related U.S. Application Data

[62] Division of Ser. No. 161,302, July 9, 1971, Pat. No. 3,772,230, which is a division of Ser. No. 835,289, May 28, 1969, Pat. No. 3,631,046.

[52] U.S. Cl...... 260/251 A, 260/251 R, 260/293.55
[51] Int. Cl............................................ C07d 51/46
[58] Field of Search........ 260/251 R, 251 A, 293.55

[56] References Cited
UNITED STATES PATENTS 3,494,927  2/1970  Frey et al........................ 260/293.4

Primary Examiner—G. Thomas Todd
Attorney, Agent, or Firm—Gerald D. Sharkin; Richard E. Vila

[57] ABSTRACT

The compounds are tetracyclic quinazolin-ones of the class of polyhydro-pyrido[1',2':3,4]-imidazo[2,1-b] or polyhydro-pyrido[1',2':3,4]-pyrimido[2,1-b] quinazolin-11-ones which are pharmacologically active as central nervous system depressants and useful, for example, as sedatives. Preparation involves reaction of novel intermediates of the class polyhydro-3-organomercapto-imidazo[1,5-a]pyridine and polyhydro-1-organomercapto-pyrido[1,2-c] pyrimidine with N-carboxy anthranilic anhydride(isatoic anhydride), or its derivatives, or with anthranilic acid, or its derivatives. The novel intermediates are in turn produced from novel compounds of the class of polyhydroimidazo-pyridine or polyhydro-pyrido-pyrimidine thiones, for example, by reaction with a haloalkyl.

9 Claims, No Drawings

ORGANOMERCAPTO-SUBSTITUTED POLYHYDRO IMIDAZO[1,5-A]PYRIDENES AND PYRIDE[1,2-C]PYRIMIDINES

This application is a division of Ser. No. 161,302, filed July 9, 1971, now U.S. Pat. No. 3,772,230, which, in turn, is a division of Ser. No. 835,289, filed May 28, 1969, now U.S. Pat. No. 3,631,046.

The present invention relates to tetracyclic compounds which are fused quinazolin-ones, methods and compositions for pharmaceutically applying the compounds, methods of producing the aforementioned quinazolinone involving novel intermediate compounds which are organomercapto derivatives of bicyclic imidazo-pyridines or pyrido-pyrimidines, and to methods and the corresponding novel thiones employed in preparation of said intermediates.

The fused quinazolin-ones of the present invention are represented by the following structural formula:

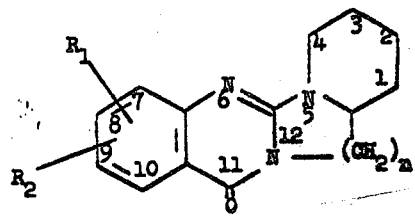

I wherein $R_1$ and $R_2$ are independently hydrogen, halo of atomic weight of from 19 to 80, lower alkyl of 1 to 4 carbon atoms, inclusive, or lower alkoxy of 1 to 4 carbons; and n is 1 or 2.

Useful as key novel intermediates in preparation of compounds I are new compounds II also provided by the present invention and having the following formula:

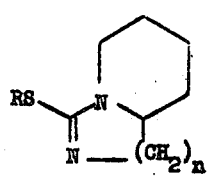

II wherein

R is lower alkyl or benzyl; and n is 1 or 2.

A preferred method of preparation of compounds of formula I in which n is 1 involves reacting in a Step A an anthranilic acid of formula III:

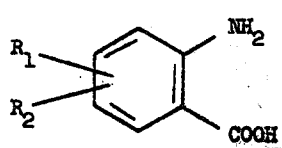

III wherein $R_1$ and $R_2$ are as defined, with an imidazo[1,5a]pyridine of formula IIA:

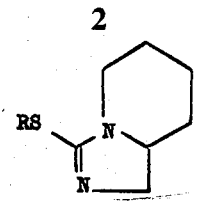

IIA wherein

R is as defined, to obtain a pyrido[1',2':3,4]-imidazo[2,1-b]-quinazolin-11-one of the formula IA:

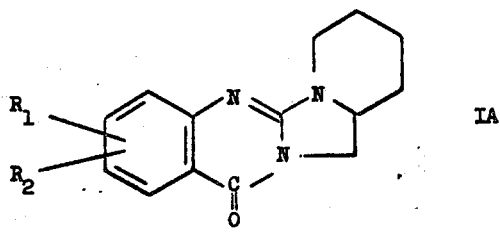

IA wherein $R_1$ and $R_2$ are as defined.

A preferred method of preparation of compounds of formula I in which n is 2 involves reacting in a Step B reaction an anthranilic acid of the formula III:

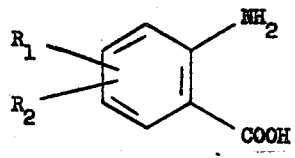

III wherein $R_1$ and $R_2$ are as defined, with a pyrido[1,2-c]pyrimidine of formula IIB:

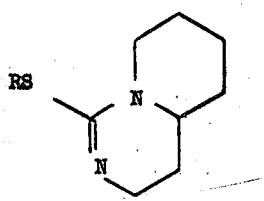

IIB wherein

R is as defined, to obtain a pyrido[1',2':3,4]-pyrimido[2,1-b]quinazolin-11-one of formula IB:

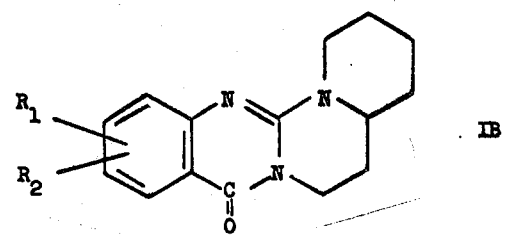

IB wherein $R_1$ and $R_2$ are as defined.

The preparation of compound IA and IB by the reaction of Step A and B respectively may be suitably carried out at elevated temperatures typically in the range of from 100°C. to 190°C., preferably 140°C. to 180°C.

The reaction is conveniently carried out in an inert organic solvent of conventional type, preferably a high boiling organic solvent such as dimethylacetamide and dimethylformamide, more preferably dimethylacetamide. The reaction products of formula IA and IB may be recovered from the reaction mixtures of Steps A and B by working up by established procedures.

An alternate process for the preparation of compounds of formula IA involves the reaction in a Step A-1 of an isatoic anhydride of formula IV:

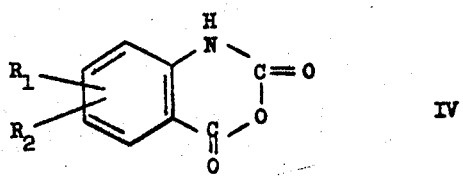

IV wherein
$R_1$ and $R_2$ are as defined provided at least one of $R_1$ and $R_2$ is hydrogen, with a compound of formula IIA whereby compounds of formula IA are obtained.

The preparation of compounds IA by the reaction of Step A-1 may be carried out at elevated temperatures in the range of 60°C. to 140°C., preferably 80°C. to 120°C. The reaction is conveniently carried in an organic solvent of conventional type providing an inert reaction medium. Cyclic ethers suitable for use at reflux temperatures represent preferred solvents, particularly dioxane. It has been observed that the reaction of Step A-1 proceeds with relative ease or difficulty depending largely on the significances of $R_1$ and $R_2$. In certain situations, for example, when $R_1$ and $R_2$ represent hydrogen, it has been found that the reaction of Step A-1 may proceed more rapidly and/or result in higher yields and therefore may be selected as the preferred process. In general, the reaction product of formula IA may be recovered from the reaction of Step A-1 by working up by conventional procedures.

The compounds of formula III and IV employed as starting material in Step A and B and Step A-1, respectively, are either know or can be prepared from known materials by established procedures.

The compounds for formula II are novel intermediates and may be prepared by reacting in a Step 1 a compound of formula V:

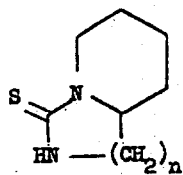

V wherein
n is as defined, with an organic halide of the formula VI:

XR

VI wherein
R is as defined and X is halo of atomic weight of from 35 to 130.

The preparation of compound II by Step 1 involving the reaction of a compound V with a compound VI may be suitably carried out at temperatures in the range of 30°C. to 100°C., preferably 40°C. to 80°C. The reaction is carried out in an organic solvent which may be any of several conventional solvents providing an inert reaction medium. The more suitable solvents include, for example, the ethers and lower alkanols, preferably methanol. The reaction product of formula II may be recovered from Step 1 by working up by established procedures.

The compounds of formula V are also novel intermediates which are preferably prepared by cyclizing in Step 2 a 2-(ω-aminoalkyl)piperidine of formula VI:

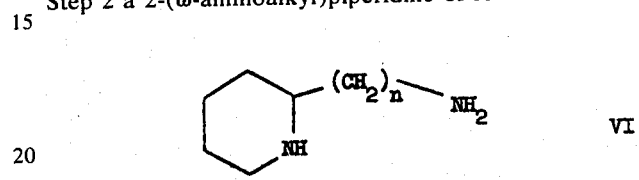

VI wherein
n is as defined, by subjecting said compound VI to reaction with carbon disulfide.

The preparation of compounds V by the reaction of Step 2 involving the reaction of a compound VI with carbon disulfide is suitably carried out at temperatures in the range of 90°C. to 140°C. The reaction is carried out in an organic solvent of which several of known type may be employed but which is desirably pyridine. The reaction product of formula VI may be recovered from Step 2 by working up by known procedures.

The compounds of formula VI employed as starting material in the reaction of Step 2 may be readily provided from available materials as described in the literature, and preferably as described hereinafter in the specific examples.

Also within the scope of the novel compounds provided by the invention are pharmaceutically acceptable salts not materially affecting the pharmacological effect of the compounds of formula I. Such salts include the acid addition salts, e.g., the hydrochloride, fumarate, formate, acetate, citrate, sulfonate, malonate, tartrate, methane sulfonate, salicylate, hydronitrate and hydrosulfate. The acid addition salts may be produced as desired from the corresponding free bases by conventional procedures. Conversely, the free bases may be obtained from the salts by procedures known in the art.

The compounds of formula I are useful because they possess pharmacological activity in animals. In general, the compounds of the invention are central nervous system depressants and useful as tranquilizers and/or sedatives as indicated, for example, by behavior tests in mice on interperitoneal administration. For this use, the dosage employed will, of course, vary depending upon known factors such as the compound used and the mode of administration. However, in general satisfactory results are obtained when administeted at a daily dosage of from about 5 milligram to about 300 milligrams per kilogram of body weight, preferably given in divided doses 2 to 4 times a day, or in sustained release form. For most mammals the administration of from about 350 to 2000 milligrams per day provides satisfactory results and dosage forms for internal administration comprise from about 80 to 1000 milligrams of the compound in admixture with a solid or liquid carrier.

The compounds of the invention usually exhibit their central nervous system depressant activity in other animal tests including those indicative of other beneficial activities in combination with that above-indicated. For example, the compounds of the formula IA such as those of Examples 4, 5, 6, 9A, 9B and 9C and also the compound of Example 8 which is a compound of formula IB are indicated as muscle relaxants in tests in mice on adminstration interperitoneally according to a modification of the method of Dunham et al, J. Am. Pharm. Assoc. 46 : 208 (1957). The compounds of Examples 5, 6 and 9B also antagonize amphetamine in mice on administration interperitoneally. The compounds of Examples 7D and 9B also inhibit chemically and electrically induced convulsions in mice on administration interperitoneally, while the compound of Example 8 inhibits chemically induced convulsions. The compounds of Examples 6, 7D and 8 reinduce hexobarbital in mice on administration interperitoneally. Examples 4 7D and 8 are mild anti-inflammatory agents as indicated by the Carrageenan-induced edema test in the rat on oral administration. The compound of Example 4 is also useful as a diuretic agent as indicated in the unanesthetized rat on oral administration according to a modification of the method of R. Aston, Tox. and Appl. Pharm. 1 : 277 (1959).

The above-mentioned additional beneficial pharmacological activities and uses of the particular compounds of the invention may be realized on administration in the same manner and within the same dosage range previously indicated.

For the above uses, the compounds may be combined with a pharmaceutically acceptable carrier, and such other conventional adjuvants as may be necessary, and are preferably administered orally in such forms as tablets, capsules, elixirs, suspensions and solutions. Such compositions may be prepared according to any method known in the art for the manufacture of pharmaceutical compositions, and such compositions may contain one or more conventional adjuvants, such as sweetenting agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredient | Parts by Weight |
|---|---|
| (11H)-1,2,3,4,13,13a-Hexahydro-7-methyl-pyrido[1',2':3,4]imidazo[2,1-b]quinazolin-11-one | 50 |
| Tragacanth | 2 |
| Lactose | 34.5 |
| Corn starch | 5 |
| Talcum | 3 |
| Magnesium stearate | 0.5 |

The following examples are for purposes of illustration only.

EXAMPLE 1

2-Aminomethylpiperidine

100 grams of aminomethylpyridine is slowly added dropwise into 900 ml of acetic acid with stirring at room temperature. There is then added 3.0 grams of platinum oxide ($PtO_2$) as catalyst and hydrogenation conducted under a pressure of 500 psi at temperature of 50° C. The catalyst is filtered, acetic acid evaporated, and the filtrate refluxed for 1 hour in a solution prepared from 400 grams of potassium hydroxide and 800 ml of water. The resulting liquid is cooled to about room temperature, extracted 4 times each with 300 ml of diethyl ether, the organic phase dried over anhydrous sodium sulfate, the ether evaporated at 40° C. and the crude oil distilled under vacuum to yield a colorless liquid having boiling point (17– 14 mm Hg) of 63° – 69° C. and Refractive Index at 20°C. of 1.4859.

EXAMPLE 2

1,5,6,7,8,8a-Hexahydro-imidazo[1,5a]pyridine-3(2H)-thione

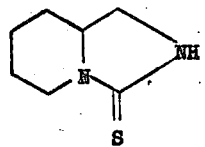

2-Aminiomethylpiperidine in an amount of 37 grams is dissolved in 250 ml of pyridine and 40 grams of carbon disulfide then added slowly under ice cooling to control the resulting strong exothermic reaction. The resulting mixture containing a yellow precipitate is heated for 6 hours at 100°–110° C., pyridine then evaporated substantially completely under vacuum and the residue crystallized from diethyl ether/pentane to obtain 1,5,6,7,8,8a-hexahydro-imidazo[1,5-a]pyridine-3(2H)-thione, mp 81°–85° C.

EXAMPLE 3
1,5,6,7,8,8a-Hexahydro-3-methylmercapto-imidazo[1,5-a]pyridine hydroiodide

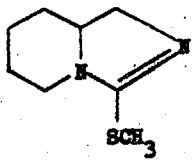

To a solution of 108 grams of 1,5,6,7,8,8a-hexahydro-imidazo [1,5-a]pyridine-3(2H)-thione in 500 ml absolute methanol is added 110 grams of methyl iodide and the resulting mixture allowed to stand for 16 hours at room temperature. The methanol is then evaporated to half the methanol volume, and the remaining solution treated with charcoal and filtered. To the filtrate is added diethyl ether to obtain on crystallization yellow needles of 1,5,6,7,8,8a-hexahydro-3-methylmercapto-imidazo[1,5-a]pyridine hydroiodide, mp 152°–156° C.

EXAMPLE 3a

The acid addition salt produced in Example 3 is dissolved in chloroform and the resulting solution treated by addition of 2N sodium hydroxide. The organic phase is separated, washed 4 times with water, dried over anhydrous sodium sulfate and evaporated in vacuo at temperature of 40°C. to obtain 1,5,6,7,8,8a-hexahydro-3-methylmercapto-imidazo[1,5-a]pyridine.

EXAMPLE 4

(11H)-1,2,3,4,13,13a-Hexahydro-pyrido[1',2':3,4]-imidazo[2,1-b]quinazolin-11one hydrochloride.

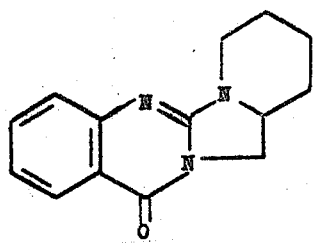

To a solution of 10 grams of 1,5,6,7,8,8a-hexahydro-3-methylmercapto-imidazo[1,5-a]pyridine in 100 ml. of absolute dioxane is added 12 grams of isatoic anhydride. The resulting mixture is stirred for 16 hours at room temperature (20°C.) and then heated for 4 hours on a steam bath. The resulting solution is evaporated to dryness, residue dissolved in chloroform and separate portions filtered over the same silica gel with added chloroform as an eluant. The filtrate first obtained from each portion is analyzed and filtrates not containing polar contamnants are combined and the resulting solution evaporated in vacuo to dryness. The resulting crude product is dissolved in methanol and treated with dry hydrogen chloride gas to crystallize (11H)-1,2,3,4,13,13a-hexahydro-pyrido [1',2':3,4]-imidazo[2,1-b]quinazolin-11-one hydrochloride, m.p. 308°– 310°C.

EXAMPLE 5

(11H)-1,2,4,13,13a-Hexahydro-9-Chloro-pyrido[1',2':3,4]imidazo [2,1-b]quinazolin-11-one hydrochloride.

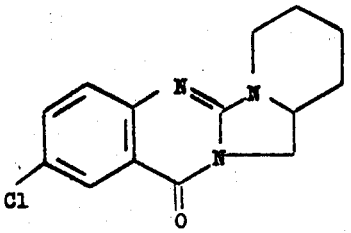

To a solution of 16.0 grams of 1,5,6,7,8,8a-hexahydro-3-methylmercapto-imidazo[1,5-a]pyridine in 200 ml. of absolute dioxane is added 23 grams of 6-chloroisatoic anhydride. The resulting mixture is heated with stirring at a temperature of 100°C. on a steam bath for 5 hours, then evaporated in vacuo to dryness at temperature of 40°C. and the solid residue dissolved in chloroform and separate portions filtered over silica gel with added chloroform as eluant. The filtrate first obtained from each portion is analyzed and filtrates not containing polar contaminants are combined and the resulting solution evaporated to dryness in vacuo at temperature of 40°C. The resulting crude solid product is dissolved in methanol and treated with dry hydrogen chloride gas to crystallize white needles of (11H)-1,2,3,4,13,13a-hexahydro-9-chloro-pyrido[1',2':3,4]imidazo[2,1-b]quinazolin-11-one hydrochloride, m.p. 294°–299°C.

EXAMPLE 6

(11H)-1,2,3,4,13,13a-Hexahydro-8,9-dimethoxy-pyrido[1',2':3,4]imidazo[2,1-b]quinazoline-11-one.

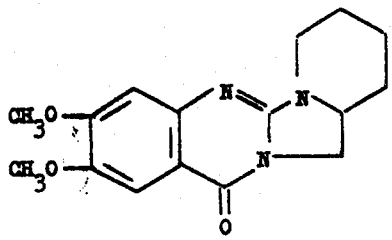

To a solution of 3 grams of 1,5,6,7,7,8a-hexahydro-3-methylmercapto-imidazo[1,5-a]pyridine in 75 mls. of dimethylacetamide is added 4 grams of 4,5-dimethoxy-2-aminobenzoic acid. The resulting mixture is heated from 20 hours at temperature of 130°C. to form a thick resinous oil which is dissolved in methylene chloride and extracted with 2N. sodium hydroxide. The organic phase is washed once with water and treated with 2N. hydrochloride acid. The resulting precipitate is filtered, dissolved in water, treated with charcoal, filtered, and made alkaline by addition of 2N. sodium hydroxide. A crystalline precipitate is formed and filtered, washed several times with large amounts of water, and dried in vacuo at temperature of 80°C. to obtain (11H)-1,2,3,4,13,13a-hexahydro-8,9 -dimethoxypyrido[1',2-

:3,4]imidazo[2,1-b]quinazoline-11-one, m.p. 163 –164 C.

EXAMPLE 7

2-Aminoethylpiperidine

Following procedure known from J.O.C. 26, 3805 (1961), 100 grams of 2-aminoethylpyridine is slowly added to 300 ml. of absolute methanol with stirring at room temperatue. 2 grams of Ruthenium oxide as catalyst is added and hydrogenation with elemental hydrogen conducted at temperatures of 90 –100 C. under pressure of 1000 psi. The resulting mixture was filtered to remove catalyst, evaporated in vacuo and the residue distilled to obtain 2-aminoethylpiperidine.

EXAMPLE 7A 2,3,4,4a,5,6,7,8-Octahydro-1H-pyrido[1,2-c]pyrimidine-1-thione.

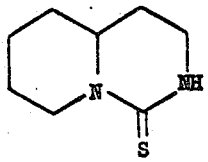

To a solution of 116 grams of 2-aminoethylpiperidine in pyridine is slowly added 80 grams of carbon disulfide with ice cooling and stirring to control the resulting exothermic reaction. The resulting mixture is refluxed for 16 hours, evaporated in vacuo at temperature of 40 C. to remove pyridine, the residue dissolved in ethanol and treated with charcoal with added dimethyl ether followed by crystallization to obtain 2,3,4,4a,5,6-,7,8-octahydro-1H-pyrido [1,2-c]pyrimidine-1-thione, m.p. 103 –107 C.

EXAMPLE 7B 4,4a,5,6,7,8-Hexahydro-1-methylmercapto-3H-pyrido[1,2-c]pyrimidine hydroiodide.

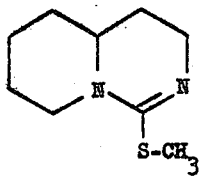

To a solution of 70 grams of 2,3,4,4a,5,6,7,8-Octahydro-1H-pyrido[1,2-c]pyrimidine-1-thione in 500 ml. of methanol is added 70 grams of methyl iodide. The resulting mixture is refluxed for 1 hour, cooled, treated by addition of diethyl ether to crystallize brown crystals of 4,4a,5,6,7,8-hexahydro-1-methylmercapto-3H-pyrido [1,2-c]pyrimidine hydroiodide, m.p. 177 –180 C.

EXAMPLE 7C

The acid addition salt produced in Example 7B is dissolved in chloroform and the resulting solution treated by addition with stirring of 2N. sodium hydroxide. The organic phase is separated, washed 4 times with water, dried over anhydrous sodium sulfate, and evaporated in vacuo at temperature of 40 C. to obtain 4,4a,5,6,7,8-Hexahydro-1-methylmercapto-3H-pyrido[1,2-c]pyrimidine.

EXAMPLE 7D 1,3,4,13,14,14a-Hexahydro-2H,11H-pyrido[1,2:3,4]pyrimido[2,1-b]quinazolin-11-one hydrochloride.

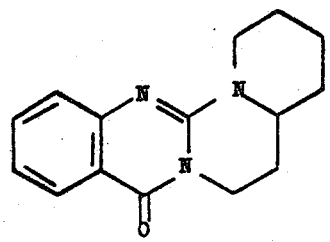

To a suspension of 1.5 grams of anthranilic acid in 25 ml. of dimethylacetamide is added 1.8 grams of 4,4a,5,-6,7,8-hexahydro-1-methylmercapto-3H-pyrido[1,2-c]pyrimidine, followed by heating at temperatures of 150 –160 C. for 16 hours. The resulting mixture is evaporated in vacuo at temperature of 40 C., the solid residue dissolved in chloroform, washed once with 2N. sodium hydroxide and twice with water, the organic phase separated, dried with sodium sulfate and evaporated in vacuo to dryness at temperature of 40 C. The residue is taken up and filtered with added chloroform-/diethyl ether (1:1) in separate portions over silica gel. The filtrate first obtained from each portion is analyzed and filtrates not containing polar contaminants are combined and the resulting solution evaporated in vacuo at temperature of 40 C. The residue is dissolved in ethanol and treated with dry gaseous hydrogen chloride followed by addition of diethyl ether to crystallize white needles of 1,3,4,13,14,14a-hexahydro-2H,11H-pyrido[1,2:3,4]pyrimido[2,1-b] quinazolin-11-one hydrochloride, m.p. 267 –270 C.

EXAMPLE 8

Following the procedure of Example 7 and employing the appropriate corresponding starting materials in approximately similar proportions there is obtained on crystallization from petroleum ether/diethyl ether in the step corresponding to Example 7D the compound 8,9-dimethoxy-1,3,4,13,14,14a-hexahydro-2H,11H-pyrido[1,2:3,4]pyrimido[2,1-b]quinazolin-11-one, m.p. 208 –209 C.

EXAMPLE 9

Following the procedure of Example 6 and employing the appropriate corresponding starting materials in approximately similar proportions there is obtained the following compounds of the invention:

A. (11H)-1,2,3,4,13,13a-Hexahydro-8-methyl-pyrido [1,2:3,4]imidazo[2,1-b]quinazolin-11-one, m.p. 181 –184 C. (from acetone/diethyl ether).

B. (11H)-1,2,3,4,13,13a-Hexahydro-7-methyl-pyrido [1,2:3,4]imidazo[2,1-b]quinazolin-11-one, m.p. 129 –130 C. (from diethyl ether/pentane).

C. (11H)-1,2,3,4,13a-Hexahydro-8-methoxy-pyrido[1,2:3,4]imidazo[2,1-b]quinazolin- 11-one, m.p. 154°–158°C. (from methylene chloride/diethyl ether).

What is claimed is:
1. A compound of the formula:

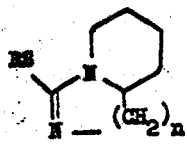

wherein
R is either lower alkyl or benzyl; and
n is 1 or 2,
or an acid addition salt thereof.
2. A compound of claim 1 in which $n$ is 1.
3. A compound of claim 2 in which R is lower alkyl.
4. The compound of claim 3 which is 1,5,6,7,8,8a-Hexahydro-3-methylmercapto-imidazo[1,5-a]pyridine.
5. The compound of claim 2 in which R is benzyl.
6. The compound of claim 1 in which n is 2.
7. The compound of claim 6 in which R is alkyl.
8. The compound of claim 7 which is 4,4a,5,6,7,8-Hexahydro-1-methylmercapto-3H-pyrido[1,2-c]pyrimidine.
9. The compound of claim 6 in which R is benzyl.

* * * * *